US012515927B2

(12) United States Patent
Koyahata et al.

(10) Patent No.: US 12,515,927 B2
(45) Date of Patent: Jan. 6, 2026

(54) CRANE

(71) Applicant: KOBELCO CONSTRUCTION MACHINERY CO., LTD., Hiroshima (JP)

(72) Inventors: Akira Koyahata, Hyogo (JP); Dairo Matsui, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 316 days.

(21) Appl. No.: 18/044,465

(22) PCT Filed: Sep. 13, 2021

(86) PCT No.: PCT/JP2021/033593

§ 371 (c)(1),
(2) Date: Mar. 8, 2023

(87) PCT Pub. No.: WO2022/075012

PCT Pub. Date: Apr. 14, 2022

(65) Prior Publication Data

US 2023/0322530 A1 Oct. 12, 2023

(30) Foreign Application Priority Data

Oct. 9, 2020 (JP) ................................ 2020-170897

(51) Int. Cl.
*B66C 23/74* (2006.01)
*B66C 23/36* (2006.01)
(Continued)

(52) U.S. Cl.
CPC .............. *B66C 23/76* (2013.01); *B66C 23/36* (2013.01); *B66C 23/78* (2013.01); *B66C 2700/0392* (2013.01)

(58) Field of Classification Search
CPC ......... B66C 23/76; B66C 23/74; B66C 23/72; B66C 2700/0392; E02F 9/18; B62D 49/085
See application file for complete search history.

(56) References Cited

U.S. PATENT DOCUMENTS 3,533,524 A * 10/1970 Wilcox .................... E02F 9/18 414/694
4,402,413 A * 9/1983 Sickler ..................... E02F 9/18 212/197
(Continued)

FOREIGN PATENT DOCUMENTS

CN 210419026 U 4/2020
JP 11-180682 A 7/1999
(Continued)

OTHER PUBLICATIONS

Extended European Search Report issued Feb. 2, 2024 in European Patent Application No. 21877315.8, 8 pages.
(Continued)

*Primary Examiner* — Anna M Momper
*Assistant Examiner* — Juan J Campos, Jr.
(74) *Attorney, Agent, or Firm* — Oblon, McClelland, Maier & Neustadt, L.L.P.

(57) ABSTRACT

A crane includes: a machine body; a tiltable body having a tiltable body proximal end supported on the machine body and being turnable in a tilting direction; a counterweight; a base weight having a placement surface that allows placement of the counterweight and being detachably attached to the machine body in either at least a front position or a rear position located behind the front position with the base weight projecting rearward further from the machine body than in the front position; and an auxiliary coupling member for coupling a portion of the base weight located in the rear
(Continued)

position and the machine body to each other, the portion projecting rearward from the machine body.

7 Claims, 14 Drawing Sheets

(51) Int. Cl.
*B66C 23/76* (2006.01)
*B66C 23/78* (2006.01)

(56) References Cited

U.S. PATENT DOCUMENTS

| | | | | |
|---|---|---|---|---|
| 6,062,405 | A | 5/2000 | Pech et al. | |
| 10,189,683 | B2* | 1/2019 | Bitz | B66C 23/76 |
| 2006/0103125 | A1* | 5/2006 | Yamamoto | B62D 49/085 280/760 |
| 2007/0122261 | A1 | 5/2007 | Hamaguchi et al. | |
| 2016/0185576 | A1* | 6/2016 | Bitz | B66C 23/76 212/197 |
| 2018/0229981 | A1 | 8/2018 | Yamamoto | |
| 2019/0194000 | A1* | 6/2019 | Bitz | B66C 23/76 |
| 2021/0300734 | A1 | 9/2021 | Oshima et al. | |

FOREIGN PATENT DOCUMENTS

| | | | |
|---|---|---|---|
| JP | 2007-162454 | A | 6/2007 |
| JP | 2010-100348 | A | 5/2010 |
| JP | 2014-129161 | A | 7/2014 |
| JP | 2017-226530 | A | 12/2017 |
| JP | 2018-131311 | A | 8/2018 |
| WO | WO 2020/031842 | A1 | 2/2020 |

OTHER PUBLICATIONS

International Search Report mailed on Nov. 30, 2021 in PCT/JP2021/033593 filed on Sep. 13, 2021, 3 pages).

* cited by examiner

CRANE

TECHNICAL FIELD

The present invention relates to a crane having a counterweight.

BACKGROUND ART

There has been conventionally known a mobile crane including a machine body having a lower traveling body and an upper slewing body, and a tillable body such as a boom. Typically, such a crane is capable of lifting a hoisted load by a hook hanging from a distal end of the boom. Patent Literature 1 discloses a crane having a counterweight. The counterweight is mounted on a rear end portion of a slewing frame of the upper slewing body. The counterweight has a function of keeping the balance of the crane against the weight of the boom and the weight of the hoisted load, and is a factor that determines the lifting capacity of the crane. The heavier the hoisted load becomes, the larger a front moment becomes that acts on the machine body to tilt the crane forward. Therefore, in order to stably lifting the hoisted load, it is necessary to maintain the stability of the crane by increasing a rear moment that acts on the machine body to tilt the crane rearward by way of increasing the number of the counterweights to balance the rear moment against the front moment.

CITATION LIST

Patent Literature

Patent Literature 1: Japanese Unexamined Patent Publication No. 2017-226530

In the technique disclosed in Patent Literature 1, an increase of the lifting capacity or an extension of the length of the boom according to the weight of the hoisted load on a work site requires an addition of a pallet weight behind the slewing frame or an attachment of a counterweight wagon to a rear of the slewing frame, which causes problems of the necessity of the preparation and the transportation thereof and of keeping a storage space therefor.

SUMMARY OF INVENTION

The present invention has been made in view of the above-mentioned problems, and an object thereof is to provide a crane which can maintain the stability of a machine body without increasing or decreasing the weight of a counterweight attached to the machine body according to a change in a lifting condition including, e.g., a length of a tiltable body and a weight of a hoisted load.

A crane according to an aspect of the present invention includes: a machine body; a tiltable body having a tiltable body proximal end supported on the machine body and being turnable in a tilting direction; a counterweight; a base weight having a placement surface that allows placement of the counterweight and being detachably attached to the machine body in either at least a front position or a rear position located behind the front position with the base weight projecting rearward further from the machine body than in the front position; and an auxiliary coupling member for coupling a portion of the base weight located in the rear position and the machine body to each other, the portion projecting rearward from the machine body.

DESCRIPTION OF EMBODIMENTS

Figure 1:
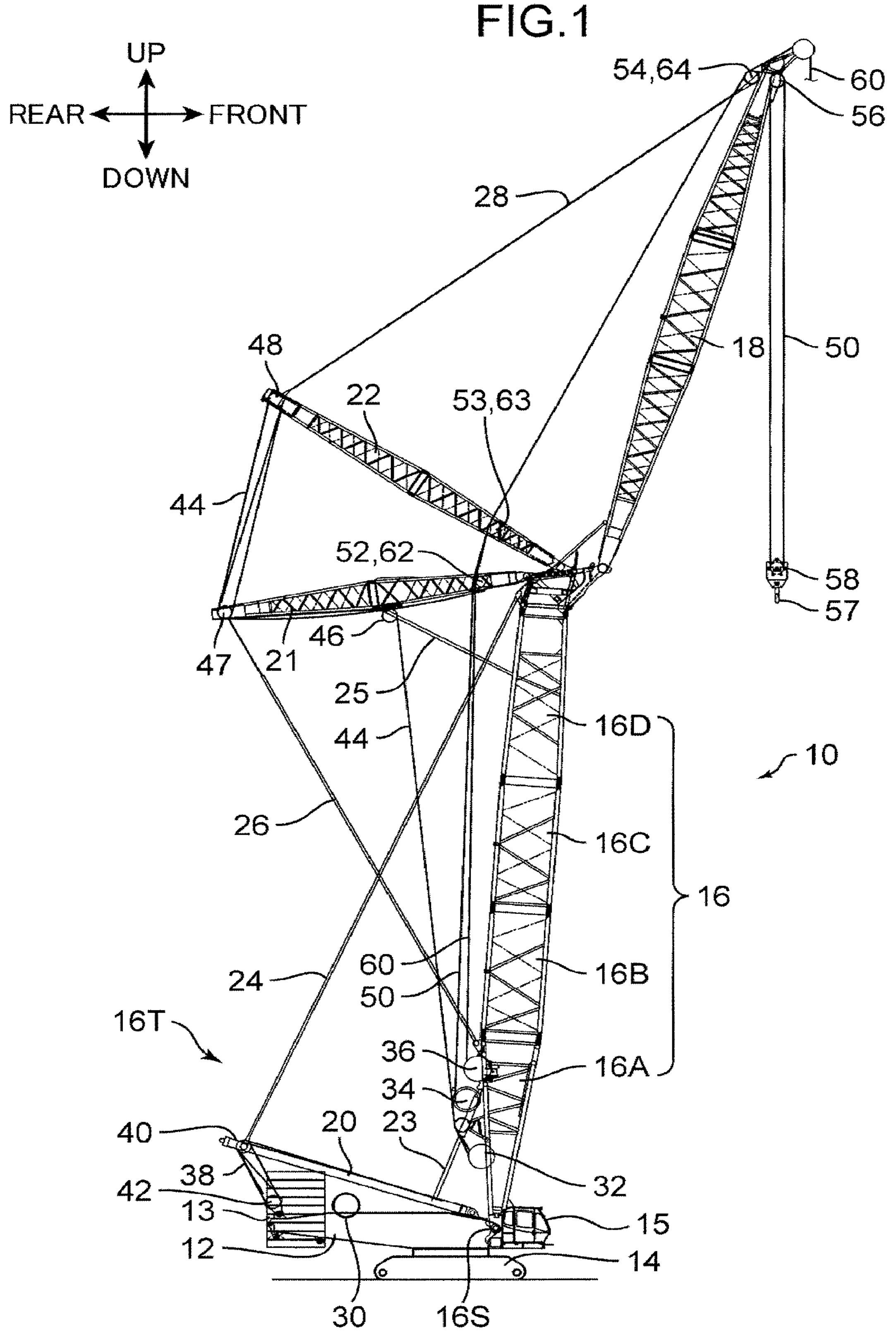
FIG. 1 is a side view of a crane according to an embodiment of the present invention.

An embodiment of the present invention will be described below with reference to the accompanying drawings. FIG. 1 is a side view of a crane 10 (working machine) according to the embodiment of the present invention. In the drawings mentioned below, directions are denoted by "UP", "DOWN", "FRONT", and "REAR"; each of the directions is defined for convenience to explain the structure and the assembling method of the crane 10 according to the present invention, and thus does not delimit any direction of movement or way of use of the crane 10.

The crane 10 includes an upper slewing body 12, which corresponds to a crane body (machine body), a weight unit 13, a lower traveling body 14 supporting the upper stewing body 12 so as to slew, a tillable member (tiltable body) including a boom 16 and a jib 18, and a mast 20, which is a boom tilting member. The upper slewing body 12 has a rear portion, at which the weight unit 13 (a base weight 13A and a counterweight 13B in FIG. 4) for adjusting the balance of the crane 10 is mounted. The upper slewing body 12 has a front end portion provided with a cab 15. The cab 15 corresponds to an operator seat of the crane 10.

The boom 16 shown in FIG. 1 is a lattice one, and has a proximal end member 16A, one or more (two in the illustrated example) intermediate members 16B, 16C, and a distal end member 16D. A rear strut 21 and a front strut 22 for turning the jib 18 as described below are turnably coupled to a distal end of the distal end member 16D. The boom 16 is supported on the upper slewing body 12 pivotably around a boom foot pin 16S serving as a fulcrum of a lower end thereof. In other words, the boom 16 has a boom proximal end (tiltable body proximal end) supported on the upper stewing body 12 and is turnable in the tilting direction, and has a boom distal end (tiltable body distal end) opposite to the boom proximal end.

In this regard, in the present invention, the structure of the boom is not mited to a specific one. For example, the boom may have no intermediate member, or a different number of intermediate members from that described above. The boom may consist of a single member.

The structure of the jib 18 is not limited to a specific one. In the illustrated example, it has a lattice structure. The jib 18 has a proximal end coupled (pivotably supported) to the distal end of the distal end member 16D of the boom 16 and is turnable. A rotational axis of the jib 18 is a lateral axis parallel to the rotational axis (boom foot pin 16S) of the boom 16 with respect to the upper slewing body 12.

The mast 20 has a mast proximal end and a mast distal end. The mast proximal end is supported on the slewing frame 120 behind the boom 16 and in front of a sheave attachment portion 122S (FIG. 2) which will be described later so as to be turnable in the tilting direction. The mast 20 has a rotational axis extending in parallel to the rotational axis of the boom 16 and just behind the rotational axis of the boom 16. In other words, the mast 20 is turnable in a direction corresponding to the tilting direction of the boom 16. On the other hand, the mast distal end of the mast 20 is located opposite to the mast proximal end, and is connected to the boom distal end of the boom 16 via a pair of right and left boom guy lines 24. In other words, the pair of right and left boom guy lines 24 connects the mast distal end and the boom distal end to each other. The connection allows the mast 20 and the boom 16 to turn in cooperation with each other.

Further, the crane 10 has the rear strut 21, the front strut 22, a pair of right and left backstops 23, the pair of right and left boom guy lines 24, and a pair of right and left backstops 25.

The pair of right and left backstops 23 is provided on the proximal end member 16A of the boom 16. The backstops 23 respectively come into contact with right and left portions of the upper slewing body 12 when the boom 16 is raised to be in a posture shown in FIG. 1. The contact restricts the boom 16 from being pushed rearward with a strong wind or the like.

The rear strut 21 and the front strut 22 are pivotably supported at the distal end of the boom 16. The rear strut 21 is held in a posture of protruding from the distal end of the distal end member 16D in a boom raising direction (a rearward direction in FIG. 1). The posture is held by the pair of right and left backstops 25 and a pair of right and left guy links 26 arranged between the rear strut 21 and the boom 16. Each of the backstops 25 connects the distal end member 16D and a middle portion of the rear strut 21 with each other for supporting the rear strut 21 from below. The guy link 26 extends under a tension to connect the distal end of the rear strut 21 and the proximal end member 16A of the boom 16 with each other, and restricts the position of the rear strut 21 by using the tension. In another embodiment, the rear strut 21 and the front strut 22 may be pivotably supported at the proximal end of the jib 18. Alternatively, the rear strut 21 may be pivotably supported at the distal end of the boom 16, and the front strut 22 may be pivotably supported at the proximal end of the jib 18.

The front strut 22 is coupled to the jib 18 so as to turn in cooperation (integrally) with the jib 18. Specifically, a pair of right and left jib guy lines 28 extends under a tension to connect the distal end of the front strut 22 and the distal end of the jib 18 with each other. Accordingly, the jib 18 turns in cooperation with the turn of the front strut 22. The rear strut 21 is arranged behind the front strut 22 and forms a shape of a substantially isosceles triangle together with the front strut 22 as shown in FIG. 1.

The crane 10 has various kinds of winches. Specifically, the crane 10 has a boom ng winch 30 for tilting the boom 16, a jib tilting winch 32 for turning the jib 18 in the tilting direction, and a main winch 34 and an auxiliary winch 36 for lifting and lowering a hoisted load. In the crane 10 according to the embodiment, the boom tilting winch 30 is mounted on the upper slewing body 12. The jib tilting winch 32, the main winch 34, and the auxiliary winch 36 are mounted on the proximal end member 16A of the boom 16. The winches 32, 34, 36 may be mounted on the upper slewing body 12.

The boom tilting winch 30 executes winding and unwinding of a boom tilting rope 38. The boom tilting rope 38 is arranged so that the mast 20 turns in accordance with the winding and the unwinding. Specifically, the mast distal end of the mast 20 and a rear end portion of the upper slewing body 12 are respectively provided with a sheave block 40 (mast sheave block) and a sheave block 42 (frame sheave block) each having a plurality of sheaves (first sheave, second sheave) arrayed in a width direction. The boom tilting rope 38 (tilting rope) drawn out from the boom tilting winch 30 extends between the sheave blocks 40, 42. Consequently, the winding and unwinding of the boom tilting rope 38 by the boom tilting winch 30 (tilting winch) brings a change in the distance between the sheave blocks 40, 42, thereby allowing the mast 20 and the boom 16 to tilt in cooperation with each other.

The jib tilting winch 32 executes winding and unwinding of a jib tilting rope 44 extending between the rear strut 21 and the front strut 22. The jib tilting rope 44 is arranged so that the front strut 22 turns in accordance with the winding and unwinding. Specifically, the rear strut 21 has a longitudinally intermediate portion provided with a guide sheave 46; a rotational end of the rear strut 21 and a rotational end of the front strut 22 are provided with respective sheave blocks 47, 48 each having a plurality of sheaves arrayed in the width direction. The jib tilting rope 44 drawn out from the jib tilting winch 32 is supported on the guide sheave 46 and extends between the sheave blocks 47, 48. Consequently, the winding and unwinding of the jib tilting rope 44 by the jib tilting winch 32 brings a change in the distance between the sheave blocks 47, 48, thereby allowing the front strut 22 and the jib 18 to turn in cooperation with each other in the tilting direction.

The main winch 34 executes lifting and lowering of the hoisted load by using a main rope 50 (winding rope). For the main lifting and lowering, main guide sheaves 52, 53, 54 are rotatably provided in the vicinities of a proximal end of the rear strut 21 and a proximal end of the front strut 22, and at the distal end of the jib 18, respectively. Further, a main sheave block having a plurality of main point sheaves 56 arrayed in the width direction is provided adjacent to the main guide sheave 54. The main rope 50 drawn out from the main winch 34 is sequentially supported on the main guide sheaves 52, 53, 54, and extends between the main point sheave 56 of the sheave block and a sheave 58 of a sheave block provided at a main hook 57 (hook) for the hoisted load. Consequently, winding and unwinding of the main rope 50 by the main winch 34 (winding winch) brings a change in the distance between the sheaves 56, 58, thereby achieving lifting and lowering of the main hook 57 connected to the main rope 50 hanging from the distal end of the jib 18.

Similarly, the auxiliary winch 36 executes lifting and lowering of the hoisted load by using an auxiliary rope 60. For the auxiliary lifting and lowering, auxiliary guide sheaves 62, 63, 64 are provided rotatably on the same shafts on which the corresponding main guide sheaves 52, 53, 54 are provided; and an unillustrated auxiliary point sheave is rotatably provided adjacent to the auxiliary guide sheave 64. The auxiliary rope 60 drawn out from the auxiliary winch 36 is sequentially supported on the auxiliary guide sheaves 62, 63, 64, and eventually hangs from the auxiliary point sheave. Consequently, winding and unwinding of the auxiliary rope 60 by the auxiliary winch 36 leads to lifting and lowering of an unillustrated auxiliary hook for the hoisted load attached to a leading end of the auxiliary rope 60.

The crane 10 has a tilting device 16T (FIG. 1). The tilting device 16T includes the mast 20, the boom guy lines 24, the sheave block 40, the sheave block 42, the boom tilting rope 38, and the boom tilting winch 30. The tilting device 16T is supported on the slewing frame 120 (FIG. 2) of the upper slewing body 12 behind the boom 16 and connected to the boom distal end of the boom 16, and is configured to turn the boom 16 in the tilting direction.

Figure 2:
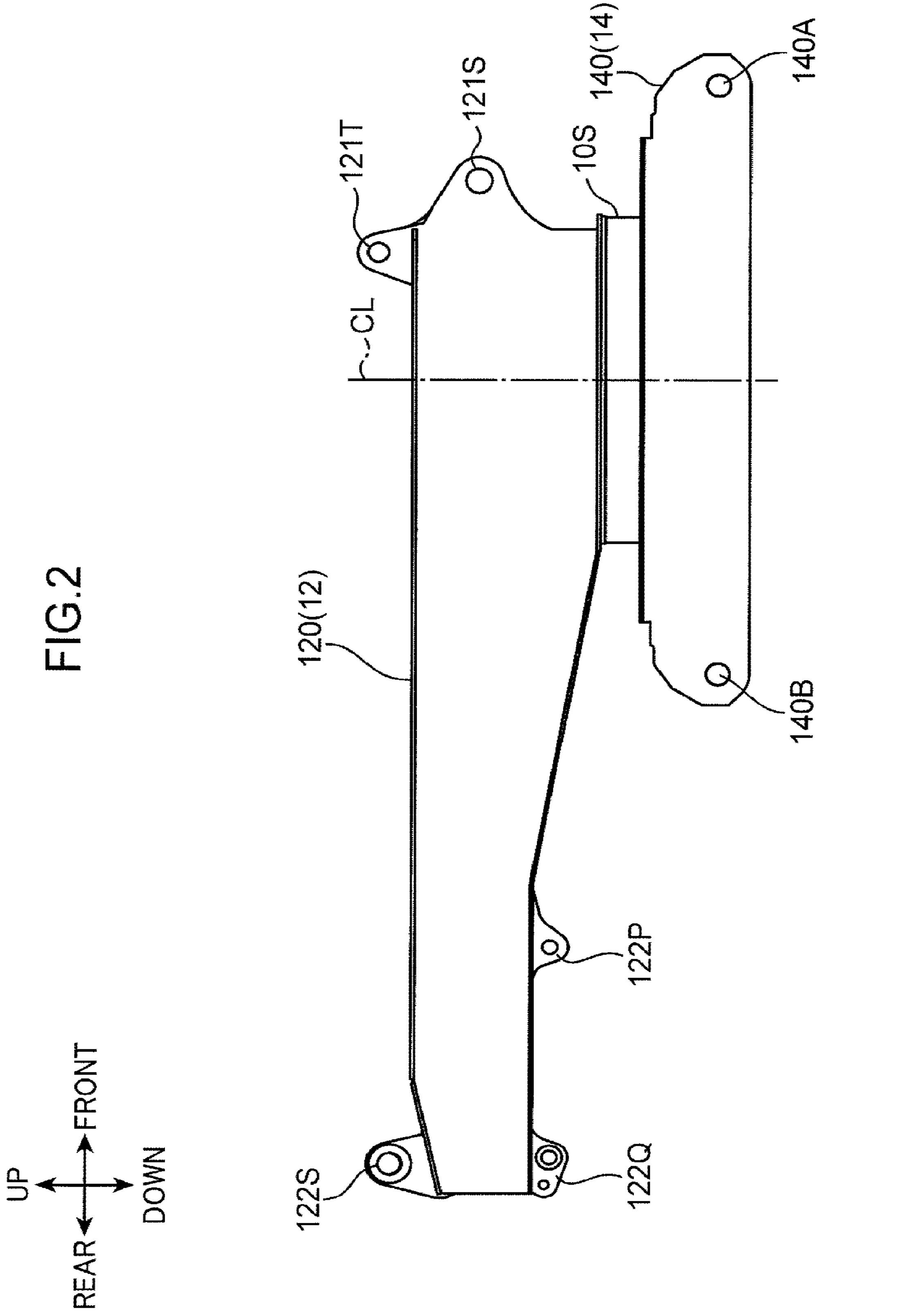
FIG. 2 is a side view of a lower frame and a stewing frame of the crane according to the embodiment of the present invention.
Figure 3:
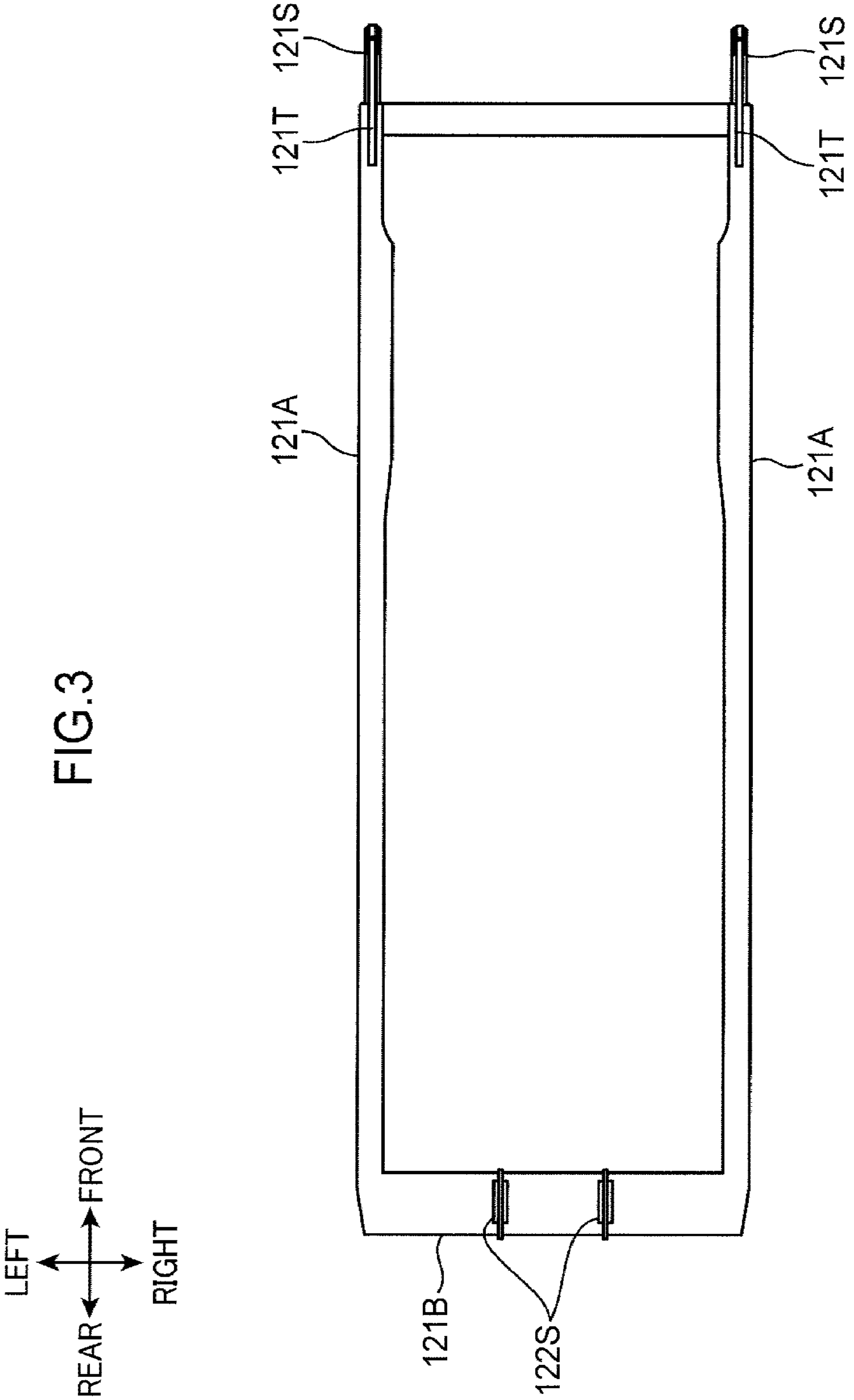
FIG. 3 is a plan view of the stewing frame of the crane according to the embodiment of the present invention.

FIG. 2 is a side view of a lower frame 140 and the slewing frame 120 of the crane 10 according to the embodiment. FIG. 3 is a plan view of the stewing frame 120 of the crane 10 according to the embodiment. In the description below, an up-down direction, a left-right direction, and a front-rear direction are defined with respect to the upper stewing body 12 (slewing frame 120). The crane 10 further has a slewing bearing 10S.

The lower traveling body 14 has the lower frame 140. The lower frame 140 is a frame body supporting each member of the lower traveling body 14, and supports the slewing frame 120 of the upper slewing body 12 which will be described later so as to slew around a stewing central axis CL extending in the up-down direction. Specifically, the lower frame 140 includes an unillustrated car body that supports the upper stewing body 12 so as to slew, and a pair of right and left crawler bodies attached to respective right and left sides of the car body. The crawler body supports a crawler so as to circle. FIG. 3 shows a front crawler axis 140A that is a rotational axis of a front roller supporting the crawler so as to circle on a front side of the crawler body and a rear crawler axis 140B that is a rotational axis of a rear roller supporting the crawler so as to circle on a rear side of the crawler body.

The upper slewing body 12 has the slewing frame 120 (frame). The slewing frame 120 is a frame body supporting each member of the upper slewing body 12. The slewing frame 120 is supported by the lower frame 140 of the lower traveling body 14 via the stewing bearing 10S so as to slew around the slewing central axis CL extending in the up-down direction. In other words, the slewing bearing 10S connects the slewing frame 120 and the car body of the lower frame 140 so that the slewing frame 120 can slew around the slewing central axis CL.

The slewing frame 120 has a pair of right and left side plates 121A (FIG. 3), a rear lateral plate 121B, a pair of right and left boom foot shaft support portions 121S, a pair of right and left mast foot shaft support portions 121T, a pair of right and left frame front coupling portions 122P (FIG. 2), a pair of right and left frame rear coupling portions 122Q, and a pair of right and left sheave attachment portions 122S.

Each of the pair of right and left side plates 121A has a certain height in the up-down direction and extends long in the front-rear direction. The pair of right and left side plates 121A has respective front end portions on which the pair of right and left boom foot shaft support portions 121S is provided; just behind the boom foot shaft support portions 121S, the pair of right and left mast foot shaft support portions 121T is provided. The boom foot shaft support portion 121S tiltably supports a boom foot of the boom 16. The mast foot shaft support portion 121T tiltably supports a mast foot of the mast 20.

The pair of right and left frame front coupling portions 122P and the pair of right and left frame rear coupling portions 122Q constitute a plurality of pairs of frame coupling portions of the present invention. Each of the plurality of pairs of frame coupling portions is located on the slewing frame 120 behind the boom 16. The pair of right and left frame front coupling portions 122P is provided on respective lower surface portions of the pair of right and left side plates 121A, and is located in a substantially middle portion in the front-rear direction between the slewing bearing 10S and a rear end portion of the slewing frame 120 as shown in FIG. 2. On the other hand, the pair of right and left frame rear coupling portions 122Q is provided on the respective lower surface portions and respective rear end portions of the pair of right and left side plates 121A. In other words, the pair of right and left frame rear coupling portions 122Q is located behind the pair of right and left frame front coupling portions 122P. Each of the frame coupling portions is formed with a pin hole along the left-right direction to receive a coupling pin P2 (see FIG. 8).

The rear lateral plate 121B couples the rear end portions of the pair of right and left side plates 121A to each other in the left-right direction. The rear lateral plate 121B constituting the rear end portion of the slewing frame 120 has a middle portion on which the pair of right and left sheave attachment portions 122S (frame auxiliary coupling portions) is provided spaced away from each other. The sheave attachment portion 122S has a function of turnably supporting the sheave block 42 described above. As shown in FIG. 3, in addition to the rear lateral plate 121B, a plurality of lateral plates in front of the rear lateral plate 121B further connects the pair of right and left side plates 121A to each other.

Figure 4:
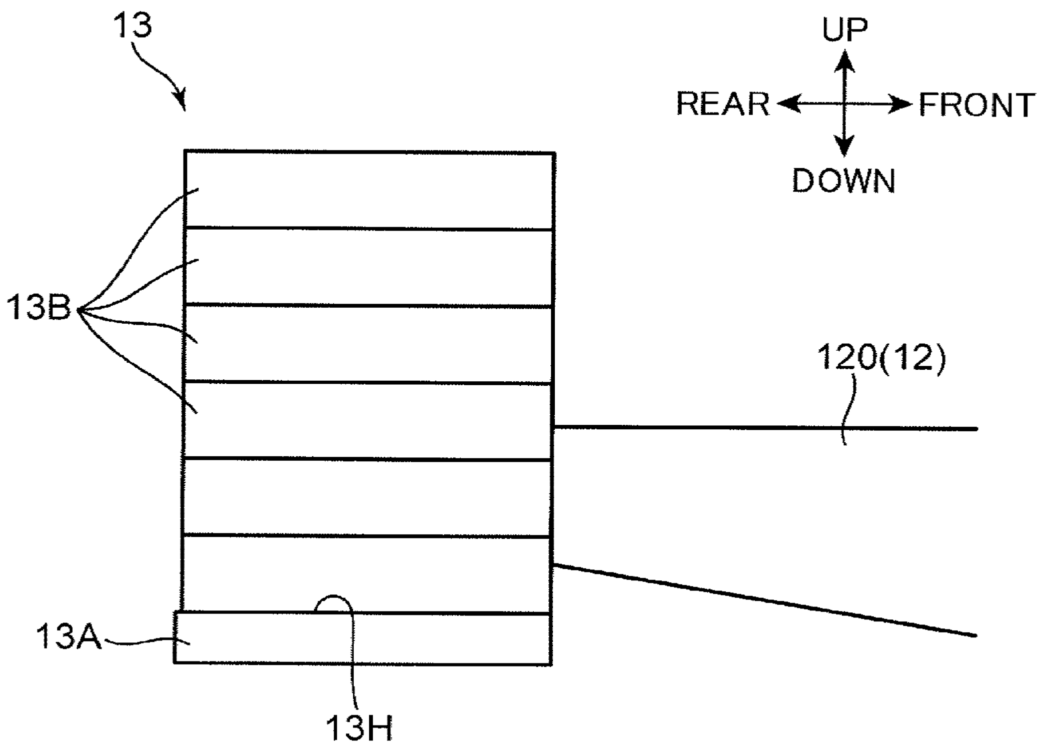
FIG. 4 is a schematic side view of a state where a counterweight according to the embodiment of the present invention is located in a front position.
Figure 5:
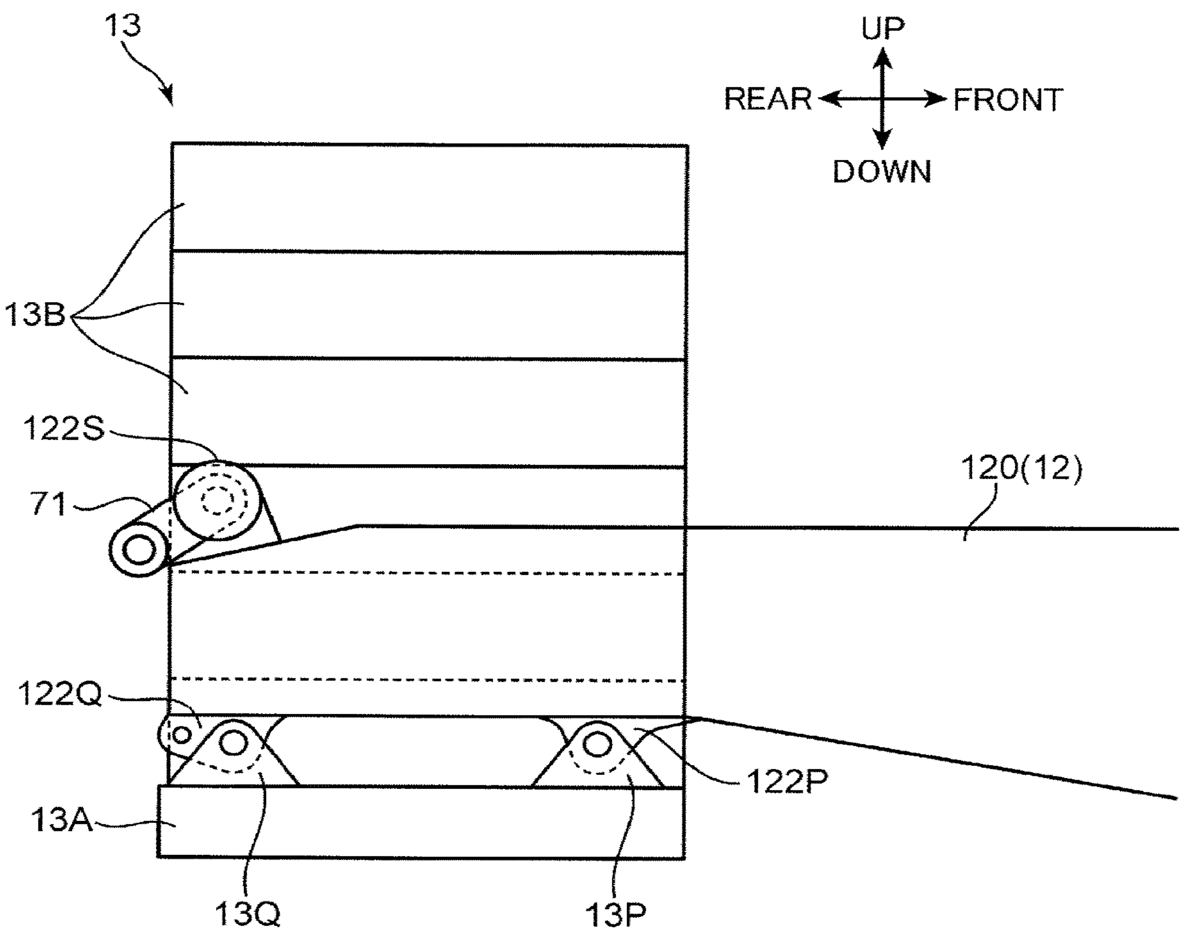
FIG. 5 is a schematic side view of the state in FIG. 4 with omission of a part of the counterweight.
Figure 6:
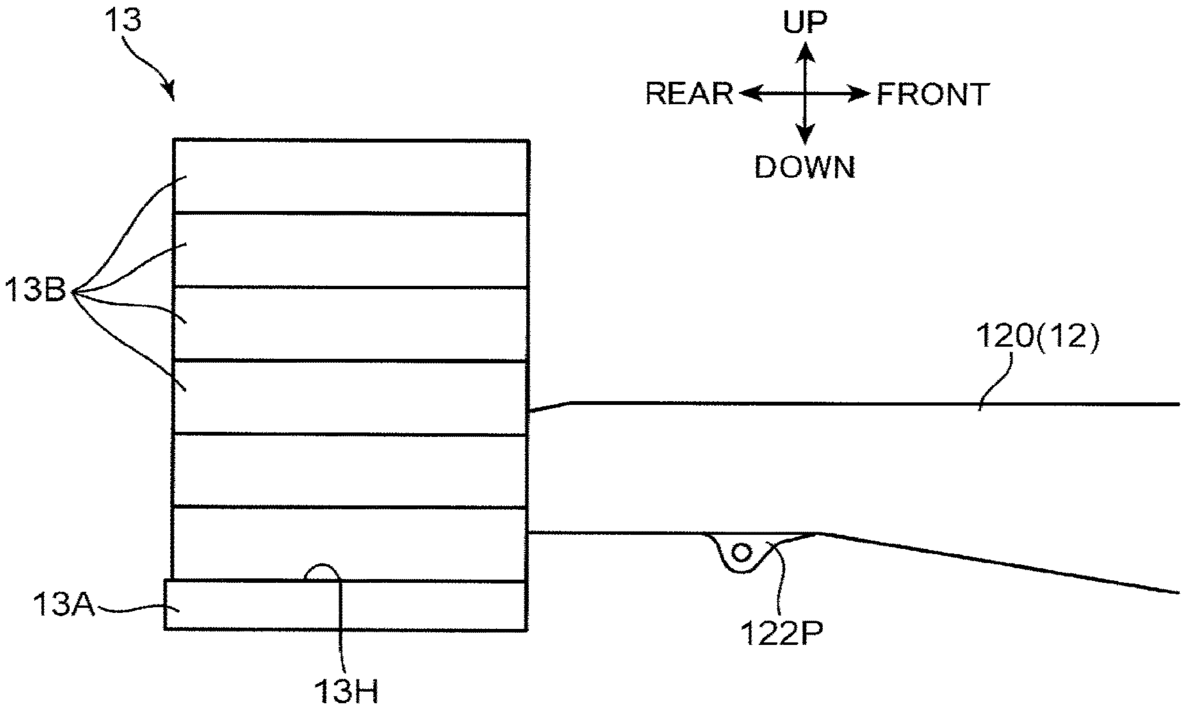
FIG. 6 is a schematic side view of a state where the counterweight according to the embodiment of the present invention is located in a rear position.
Figure 7:
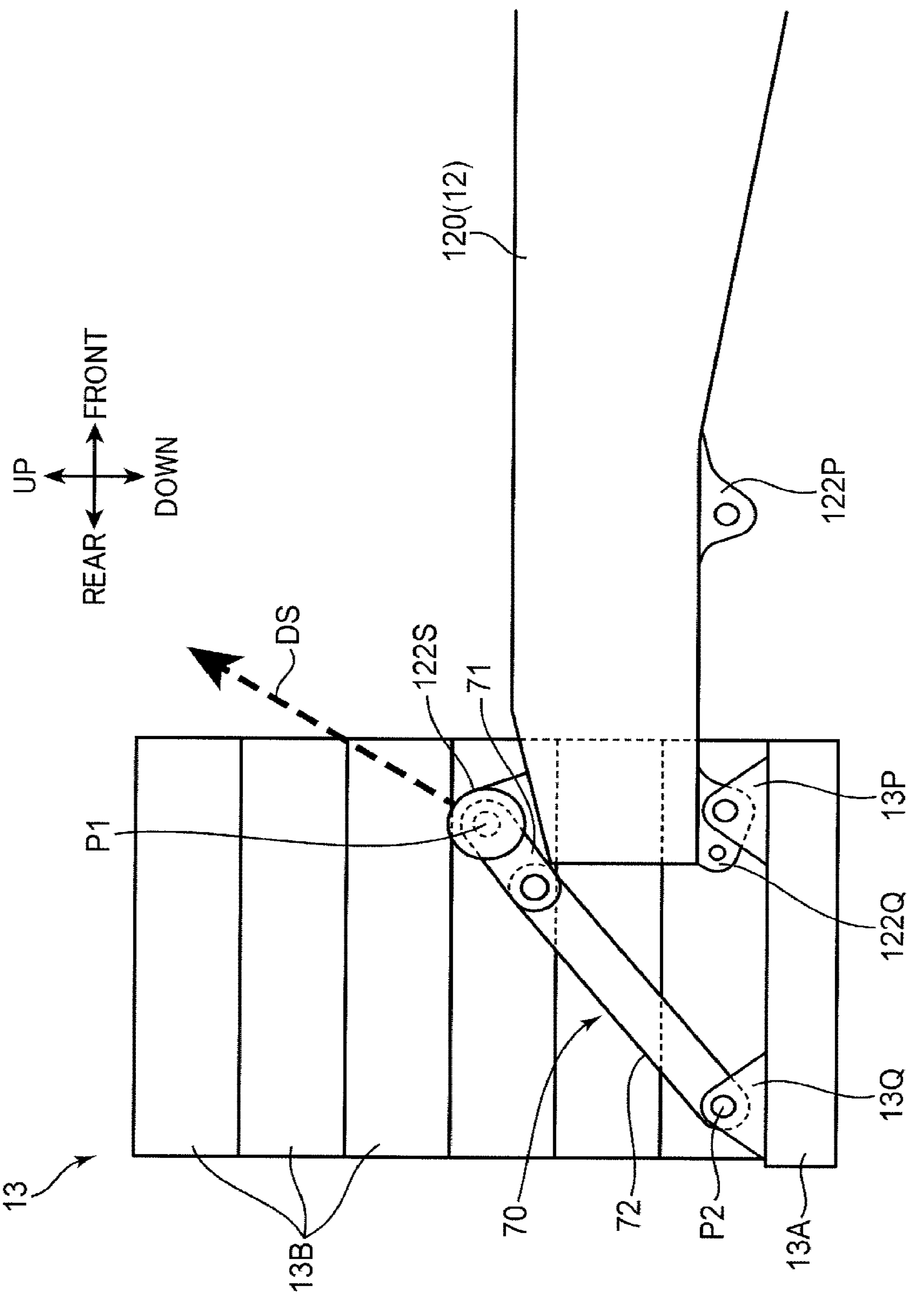
FIG. 7 is a schematic side view of the state in FIG. 6 with omission of a part of the counterweight.
Figure 8:
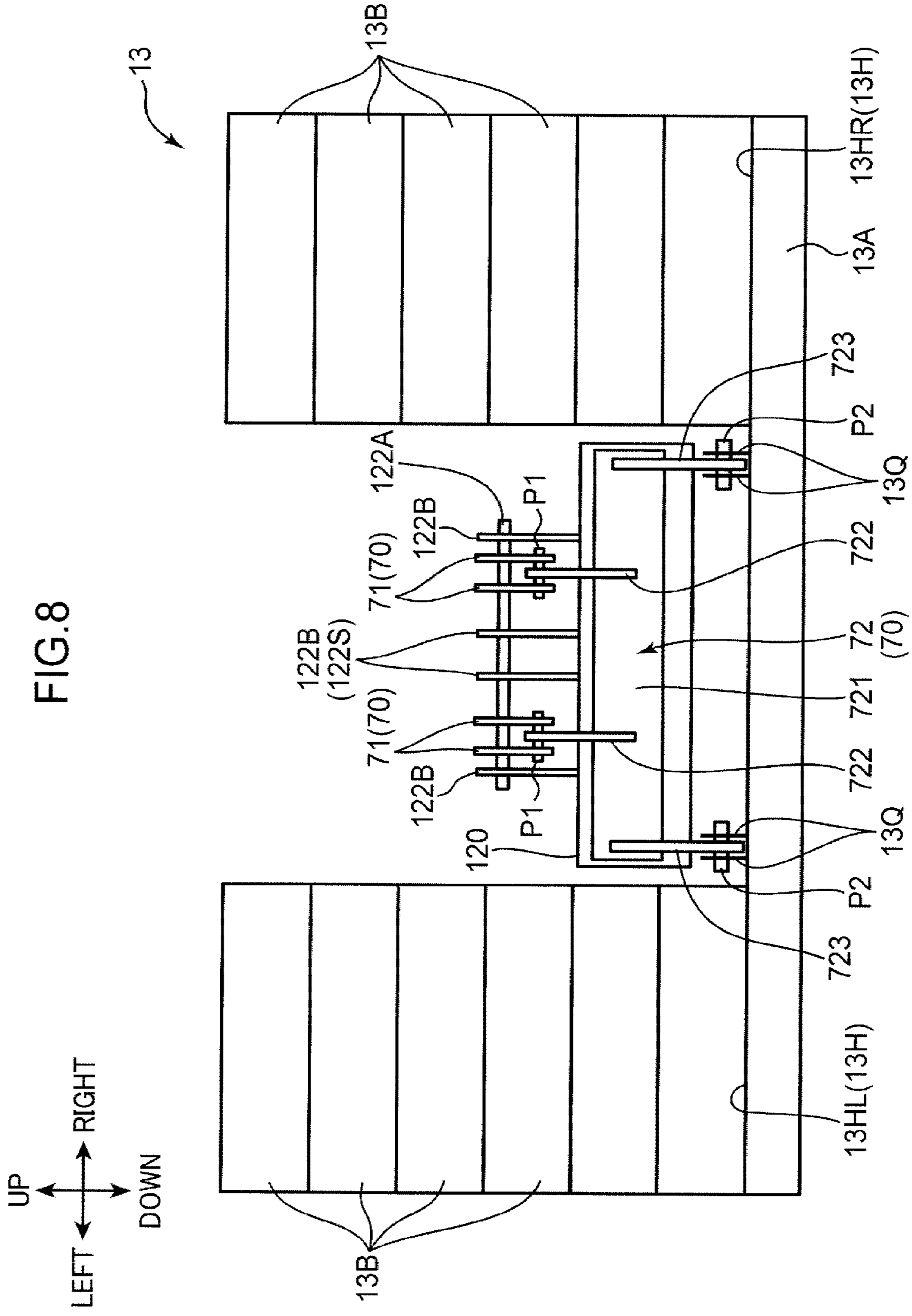
FIG. 8 is a rear view of the slewing frame and a weight unit of the crane according to the embodiment of the present invention.
Figure 9:
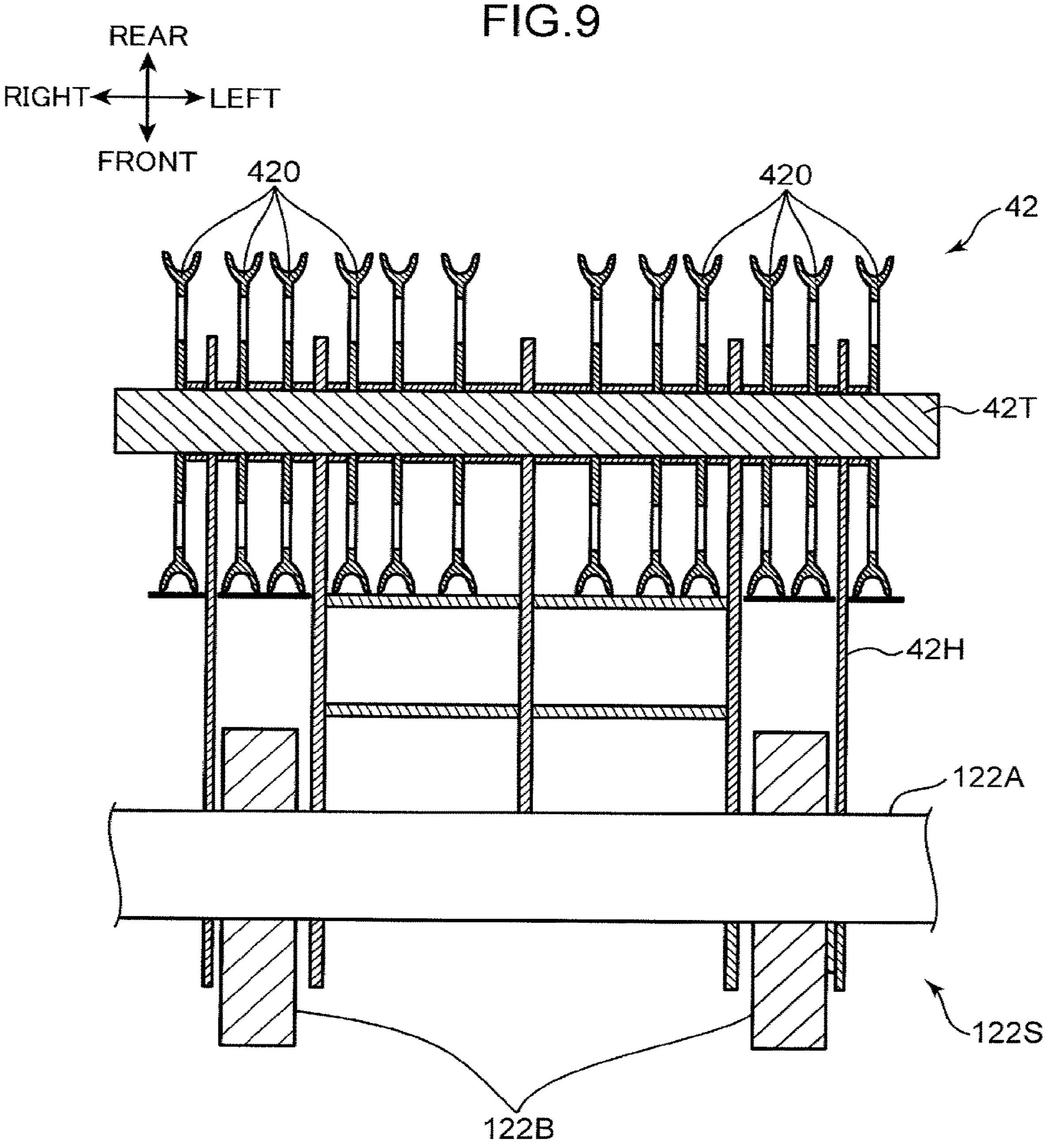
FIG. 9 is a horizontal sectional view of a frame sheave block of the crane according to the embodiment of the present invention.
Figure 10:
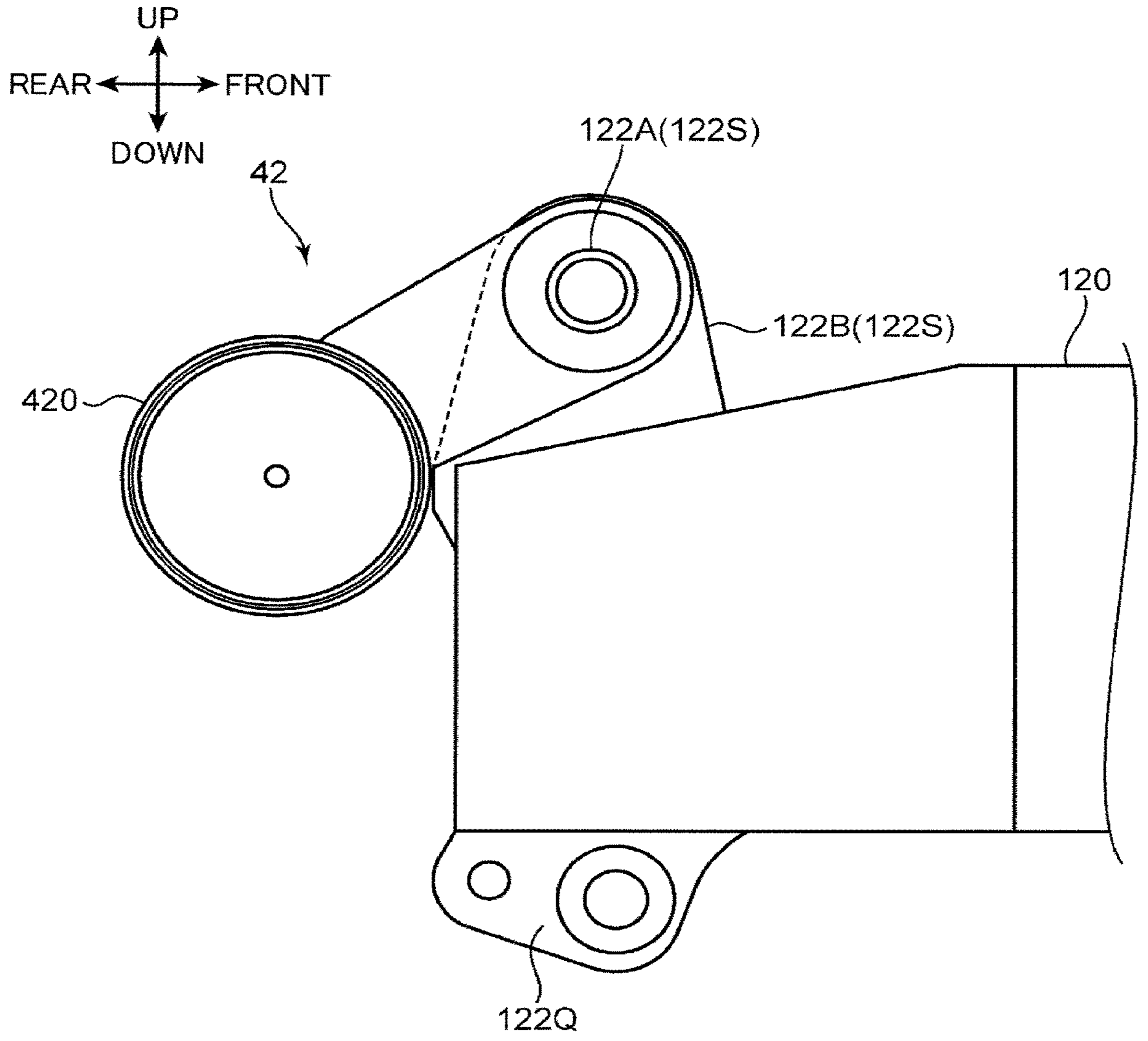
FIG. 10 is a side view of a state where the frame sheave block is supported on the slewing frame of the crane according to the embodiment of the present invention.

FIG. 4 is a schematic side view of a state (front coupling state) where the weight unit 13 according to the embodiment is located in a front position. FIG. 5 is a schematic side view of the state in FIG. 4 with omission of a part of the weight unit 13. FIG. 6 is a schematic side view of a state (rear coupling state) where the weight unit 13 according to the embodiment is located in a rear position. FIG. 7 is a schematic side view of the state in FIG. 6 with omission of a part of the weight unit 13. FIG. 8 is a rear view of the slewing frame 120 and the counterweight 13B of the crane 10 according to the embodiment. FIG. 9 is a horizontal sectional view of the sheave block 42 of the crane 10 according to the embodiment. FIG. 10 is a side view of a state where the sheave block 42 is supported on the slewing frame 120 of the crane 10 according to the embodiment.

The weight unit 13 includes a base weight 13A and a plurality of counterweights 13B mounted (placed) on the base weight 13A. Further, the crane 10 has a link unit 70 (auxiliary coupling member) (FIG. 7).

The base weight 13A has a placement surface 13H that allows placement of the counterweights 13B, and is detachably attached to the rear end portion of the slewing frame 120. In the embodiment, the base weight 13A is detachably attached to the upper slewing body 12 in either at least the front position or the rear position located behind the front position with the base weight projecting rearward further from the upper slewing body 12 than in the front position. The base weight 13A is a plate-like weight member that has a substantially rectangular shape in a plan view and has a certain thickness in the up-down direction. As shown in FIG. 8, the base weight 13A has such a size in the left-right direction as to project from left and right sides of the slewing frame 120 in a view of the front-rear direction. The placement surface 13H of the base weight 13A includes a right placement surface 13HR and a left placement surface 13HL respectively located on the right and left of the stewing frame 120 in the view of the front-rear direction. As shown in FIG. 8, the counterweights 13B are weights that are placed and stacked on the respective right placement surface 13HR and left placement surface 13HL. Each of the counterweights 13B is fixed to each other by way of an unillustrated fixing tool, and so are the lowest counterweight 13B and the base weight 13A, in order to ensure the safety. For the base weight 13A, a member may be acceptable that allows placement of the counterweight 13B and has a required weight even if not having an apparent function as a weight.

Further, the base weight 13A has a pair of right and left weight front coupling portions 13P and a pair of right and left weight rear coupling portions 13Q. The interval between the pair of right and left weight front coupling portions 13P and the interval between the pair of right and left weight rear coupling portions 13Q are determined so as to agree with the interval between the pair of right and left frame front coupling portions 122P and the interval between the pair of right and left frame rear coupling portions 122Q respectively. Each of the coupling portions has a pin hole that allows a coupling pin P2 to pass therethrough. In the embodiment, the pair of right and left weight front coupling portions 13P and the pair of right and left weight rear coupling portions 13Q are provided on an upper surface portion of the base weight 13A (FIG. 7 and FIG. 8).

The pair of right and left weight front coupling portions 13P is selectively coupled to one of the pair of right and left frame front coupling portions 122P and the pair of right and left frame rear coupling portions 122Q by a pair of right and left coupling pins P2 (FIG. 5 and FIG. 7).

The pair of right and left weight rear coupling portions 13Q is located behind the pair of right and left weight front coupling portions 13P. The relative position in the front-rear direction of the pair of right and left weight rear coupling portions 13Q to the pair of right and left weight front coupling portions 13P is determined so that the pair of right and left weight rear coupling portions 13Q is couplable to the pair of right and left frame rear coupling portions 122Q in a front coupling state where the pair of right and left weight front coupling portions 13P is coupled to the pair of right and left frame front coupling portions 122P, i.e., so that the coupling pin P2 can be inserted to the pin hole of each of the coupling portions. Further, the pair of right and left weight rear coupling portions 13Q is located behind the slewing frame 120 in a rear coupling state where the pair of right and left weight front coupling portions 13P is coupled to the pair of right and left frame rear coupling portions 122Q (see FIG. 7).

As described above, the pair of right and left sheave attachment portions 122S (frame auxiliary coupling portions) is provided on the rear end portion of the slewing frame 120. Specifically, as shown in FIG. 8, the sheave attachment portion 122S has a plurality of sheave support portions 122B (a plurality of pin support portions) and a sheave support pin 122A (support pin). The plurality of sheave support portions 122B is plate-like members provided on the rear end portion of the slewing frame 120 and spaced away from each other in the left-right direction. The sheave support pin 122A extends in the left-right direction to connect the sheave support portions 122B to each other.

The structure of the sheave block 42 (frame connection portion) in FIG. 1 will be further described with reference to FIG. 9 and FIG. 10. The sheave block 42 is a unit (or called a spreader) that enables attachment of a plurality of sheaves 420 to the sheave attachment portion 122S and rotatably supports each sheave 420. The sheave block 42 has a sheave holder 42H that rotatably supports the sheaves 420 and a sheave shaft 42T around which the sheaves 420 rotates. As shown in FIG. 9, centrally arranged two sheave support portions 122B among the sheave support portions 122B shown in FIG. 8 are fitted in two right and left fitting portions formed on the sheave holder 42H. The fitting portion has a retainer for preventing detachment from the sheave support pin 122A. As another embodiment, it may be appreciated to provide a sheave support pin 122A separable to right and left, and make each fitting portion of the sheave holder 42H have a pin hole that allow the sheave support pin 122A to pass therethrough. In this case, after the two sheave support portions 122B are fitted in the two right and left fitting portions formed on the sheave holder 42H, the sheave support pins 122A are inserted through the respective pin holes, and the sheave block 42 is thereby turnably supported on the sheave attachment portion 122S. FIG. 10 shows a state where the sheave block 42 is attached to and supported on the sheave attachment portion 122S. A tension in the boom tilting rope 38 wound between the sheave block 40 and the sheave block 42 causes the sheave block 42 to turn upward around the sheave support pin 122A from the state shown in FIG. 10.

As described above, the sheave block 42 is attached (connected) to the sheave attachment portion 122S in FIG. 8. Specifically, the sheave block 42 is supported on the sheave support pin 122A of the sheave attachment portion 122S. Further, the sheave block 42 constitutes the tilting device 16T described above. The sheave block 42 is supported by the sheave attachment portion 122S of the slewing frame 120 so as to apply at least upward force as shown in the arrow DS in FIG. 7 to the rear end portion of the slewing frame 120 when the tilting device 16T tiltably supports the boom 16 as shown in FIG. 1.

The link unit 70 can couple a portion of the base weight 13A located in the rear position and the upper slewing body 12 to each other, the portion projecting rearward from the upper slewing body 12. Particularly, in the embodiment, the link unit 70 is configured to couple the slewing frame 120 of the upper slewing body 12 and the base weight 13A. Specifically, the link unit 70 can couple the sheave support pin 122A of the sheave attachment portion 122S and the pair of right and left weight rear coupling portions 13Q to each other in the rear coupling state (FIG. 7).

The link unit 70 has a pair of right and left sheave links 71 (first coupling members) and a weight link 72 (second coupling member).

As shown in FIG. 8, the pair of right and left sheave links 71 is coupled to the sheave support pin 122A on the right and left of the sheave block 42 (sheave attachment portion 122S) respectively. The pair of right and left sheave links 71 is coupled to the sheave support pin 122A in advance, or may be coupled to the sheave support pin 122A as necessary. In the embodiment, each sheave link 71 includes a pair of plate-like members each having a lower end portion formed with an unillustrated pin hole that allows a coupling pin P1 to pass therethrough.

The weight link 72 couples the pair of right and left sheave links 71 and the pair of right and left weight rear coupling portions 13Q of the base weight 13A to each other. The weight link 72 has a link base portion 721, a pair of right and left upper links 722 (upper coupling portions), and a pair of right and left lower links 723 (lower coupling portions).

The link base portion 721 constitutes a body portion of the upper link 722, is a plate-like member extending in the left-right direction or a member having a cuboid shape, and slants upward as advancing forward. The shape and the structure of the link base portion 721 are not limited to this configuration.

The pair of right and left upper links 722 is provided spaced away from each other in a middle portion of the link base portion 721 in the left-right direction. Each of the pair of right and left upper links 722 extends upward from the link base portion 721, and has an upper end portion formed with an unillustrated pin hole that allows the coupling pin P1 to pass therethrough. The pair of right and left upper links 722 is coupled to the pair of right and left sheave links 71 by the coupling pins P1, respectively. The pair of right and left lower links 723 is provided on opposite end portions of the link base portion 721 in the left-right direction, i.e., at outer positions in the left-right direction from the pair of right and left sheave links 71. Each of the pair of right and left lower links 723 extends downward from the link base portion 721, and has a lower end portion formed with an unillustrated pin hole that allows the coupling pin P2 to pass therethrough. The pair of right and left lower links 723 is coupled to the pair of right and left weight rear coupling portions 13Q by the coupling pins P2, respectively (FIG. 8).

Next, an operational process of moving the weight unit 13 including the base weight 13A and the counterweights 13B in the front-rear direction in the crane 10 according to the embodiment will be described. The following description starts with the state where the pair of right and left sheave links 71 (FIG. 8) is connected to the sheave attachment portion 122S (sheave support pin 122A) in advance (FIG. 5).

In the case that the weight unit 13 is in the front coupling state (located in the front position) as shown in FIG. 4 and FIG. 5, a worker firstly detaches the counterweights 13B from the base weight 13A. The counterweights 13B placed on the placement surface 13H are detached one by one, or may be detached collectively.

Next, the worker lifts the counterweights 13B by using an unillustrated auxiliary crane (or called an accompanying machine) to detach and bring them from the base weight 13A down to the ground.

Next, the worker hangs the base weight 13A by using the auxiliary crane and decouples the base weight from the slewing frame 120. Specifically, the pair of right and left coupling pins P2 that couples the pair of right and left frame front coupling portions 122P and the pair of right and left weight front coupling portions 13P is removed; and the pair of right and left coupling pins P2 that couples the pair of right and left frame rear coupling portions 122Q and the pair of right and left weight rear coupling portions 13Q is removed.

Further, the worker moves the base weight 13A to the rear position shown in FIG. 6 and FIG. 7 by using the auxiliary crane, and couples the pair of right and left frame rear coupling portions 122Q and the pair of right and left weight front coupling portions 13P by using the pair of right and left coupling pins P2, respectively.

Next, the worker couples the pair of right and left upper links 722 of the weight link 72 to the sheave links 71 by using a pair of right and left coupling pins P1, and couples the pair of right and left lower links 723 of the weight link 72 to the pair of right and left weight rear coupling portions 13Q by using the pair of right and left coupling pins P2, respectively. Thus, the base weight 13A is supported by the slewing frame 120 in the rear position.

Further, the worker replaces the counterweights 13B kept on the ground onto the base weight 13A by using the auxiliary crane, and fixes them by using the unillustrated fixing tool. Thus, the weight unit 13 is fixed in the rear position.

As described above, in the embodiment, the base weight 13A can be selectively attached to the slewing frame 120 in either at least the front coupling state (front position) or the rear coupling state (rear position) by changing the coupling position of the base weight 13A with respect to the plurality of pairs of frame coupling portions provided on the slewing frame 120. Thus, the counterweights 13B can be located in two (a plurality of) positions in the front-rear direction. This enables a change in the magnitude of a moment by the counterweights 13B and the base weight 13A that acts on the upper slewing body 12 according to a change in a lifting condition including, e.g., the length of the boom 16 and the jib 18 and the weight of the hoisted load, without a change in the weight of the counterweights 13B placed on the base weight 13A. Thus, the stability of the crane 10 (upper slewing body 12) can be maintained. Further, the link unit 70 can couple the pair of right and left weight rear coupling portions 13Q located behind the slewing frame 120 (portion of the base weight 13A projecting rearward from the slewing frame 120) and the sheave attachment portion 122S of the upper slewing body 12. This can prevent a rear portion of the base weight 13A from bending downward.

Further, in the embodiment, a connection destination (frame auxiliary coupling portion) of the link unit 70 is located in a juxtaposed arrangement to the sheave attachment portion 122S on the rear end portion of the slewing frame 120 so as to apply at least downward force to the sheave block 42 owing to the weight of the counterweights 13B (weight unit 13) in the rear coupling state where the link unit 70 couples the sheave attachment portion 122S and the pair of right and left weight rear coupling portions 13Q to each other.

In this configuration, a support by the tilting device 16T of the boom 16 gives an upward force on the rear end portion of the slewing frame 120 through the sheave block 42. On the other hand, a coupling by the link unit 70 of the sheave attachment portion 122S and the pair of right and left weight rear coupling portions 13Q to each other gives at least a downward force on the sheave block 42 owing to the weight of the counterweights 13B. The upward force and the downward force partially offset each other, which causes the sheave block 42 of the tilting device 16T to function as a support of the counterweights 13B and the base weight 13A. This prevents the rear end portion of the slewing frame 120 and the base weight 13A from bending downward.

In other words, the weight of the counterweights 13B acts downward on the sheave block 42 through the link unit 70, and the weight of the boom 16 and the hoisted load acts on the sheave block 42 so that the boom distal end of the boom 16 pulls the sheave block 42 upward. Therefore, the sheave block 42 connected to the boom distal end thus functions as a support of the pair of right and left weight rear coupling portions 13Q via the link unit 70. This prevents a portion of the base weight 13A located behind the slewing frame 120 from bending downward and can enhance the stability of the upper slewing body 12.

Further, in the embodiment, a placement of the counterweights 13B on the base weight 13A causes the weight of the base weight 13A and the counterweights 13B to act at least downward on the sheave support pin 122A through the base weight 13A, the pair of right and left weight rear coupling portions 13Q, and the link unit 70. On the other hand, a support by the tilting device 16T of the boom 16 gives at least upward force on the sheave support pin 122A through the boom distal end, the boom guy lines 24, the sheave block 40, the boom tilting rope 38, and the sheave block 42. Therefore, the sheave block 42 connected to the boom distal end directly supports the pair of right and left weight rear coupling portions 13Q via the sheave support pin 122A, serving such function as if the sheave block 42 were located on the rear end portion of the base weight 13A. This prevents the portion of the base weight 13A located behind the slewing frame 120 from bending downward more effectively. Thus, the stability of the upper slewing body 12 can be further enhanced.

Further, in the embodiment, the counterweights 13B can be placed on the right placement surface 13HR and the left placement surface 13HL of the base weight 13A respectively located on the right and left of the slewing frame 120 in the view of the front-rear direction. Thus, the stability of the upper slewing body 12 in the left-right direction as well as in the front-rear direction can be enhanced. Further, a location of the pair of weight links 72 close to the sheave block 42 in the left-right direction eases transmission of a force between the sheave block 42 and the link unit 70 via the sheave support pin 122A and enables the pair of right and left lower links 723 of the weight link 72 of the link unit 70 to stably support the base weight 13A having a width in the left-right direction larger than that of the slewing frame 120.

The crane 10 according to the embodiment of the present invention is described above. The present invention is not limited to these aspects. For example, the present invention can receive the following modifications.

(1) In the embodiment above, a crane according to the present invention is not limited to the crane 10 described above, and may be a crane having another structure, e.g., a tower crane. The crane is not limited to a crane movable on the ground. The structure of the crane 10 is not limited to that shown in FIG. 1, and may be another structure, e.g., a structure that has no jib.

Figure 11:
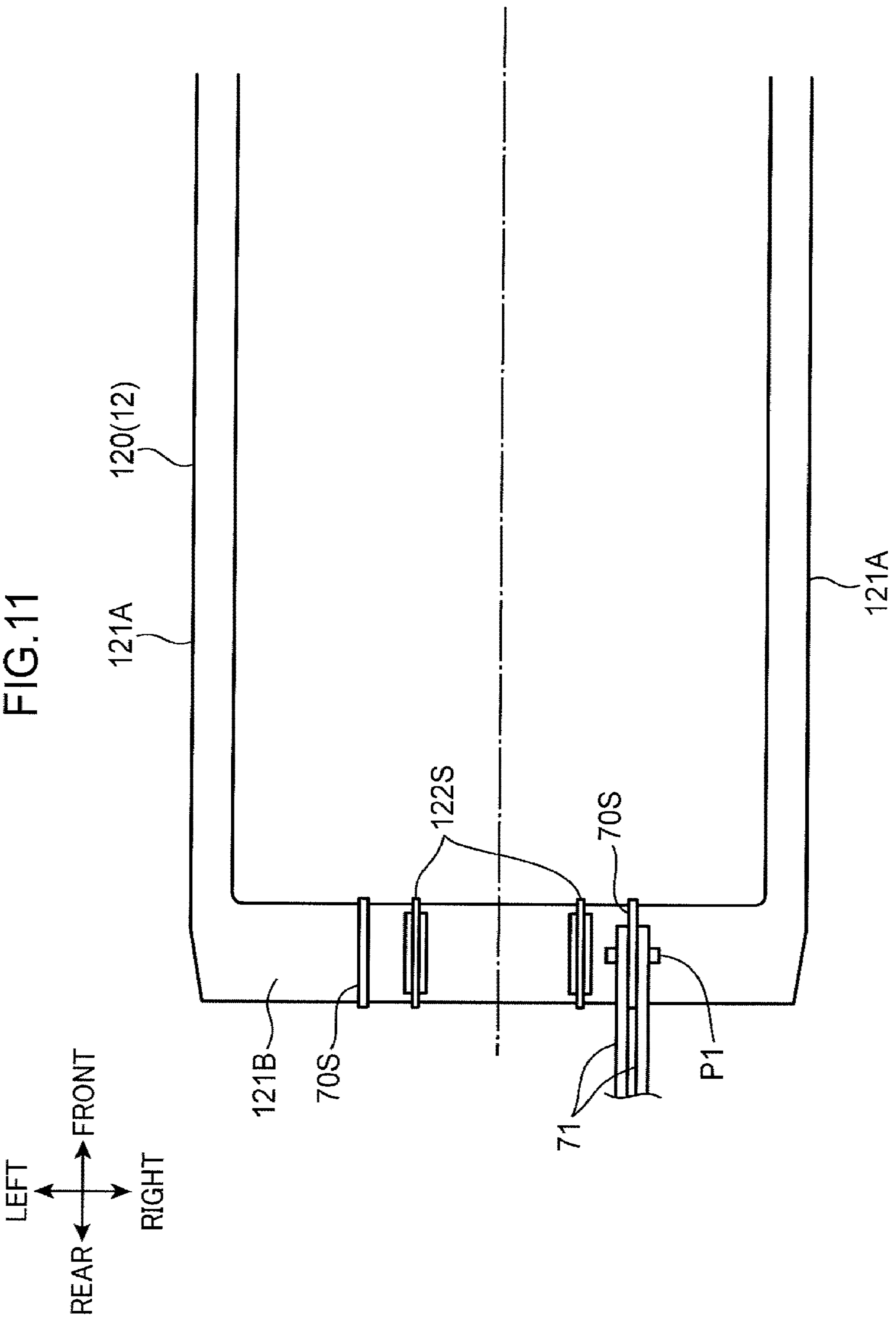
FIG. 11 is a plan view of a stewing frame and a sheave link of a crane according to a first modification of the present invention.
Figure 12:
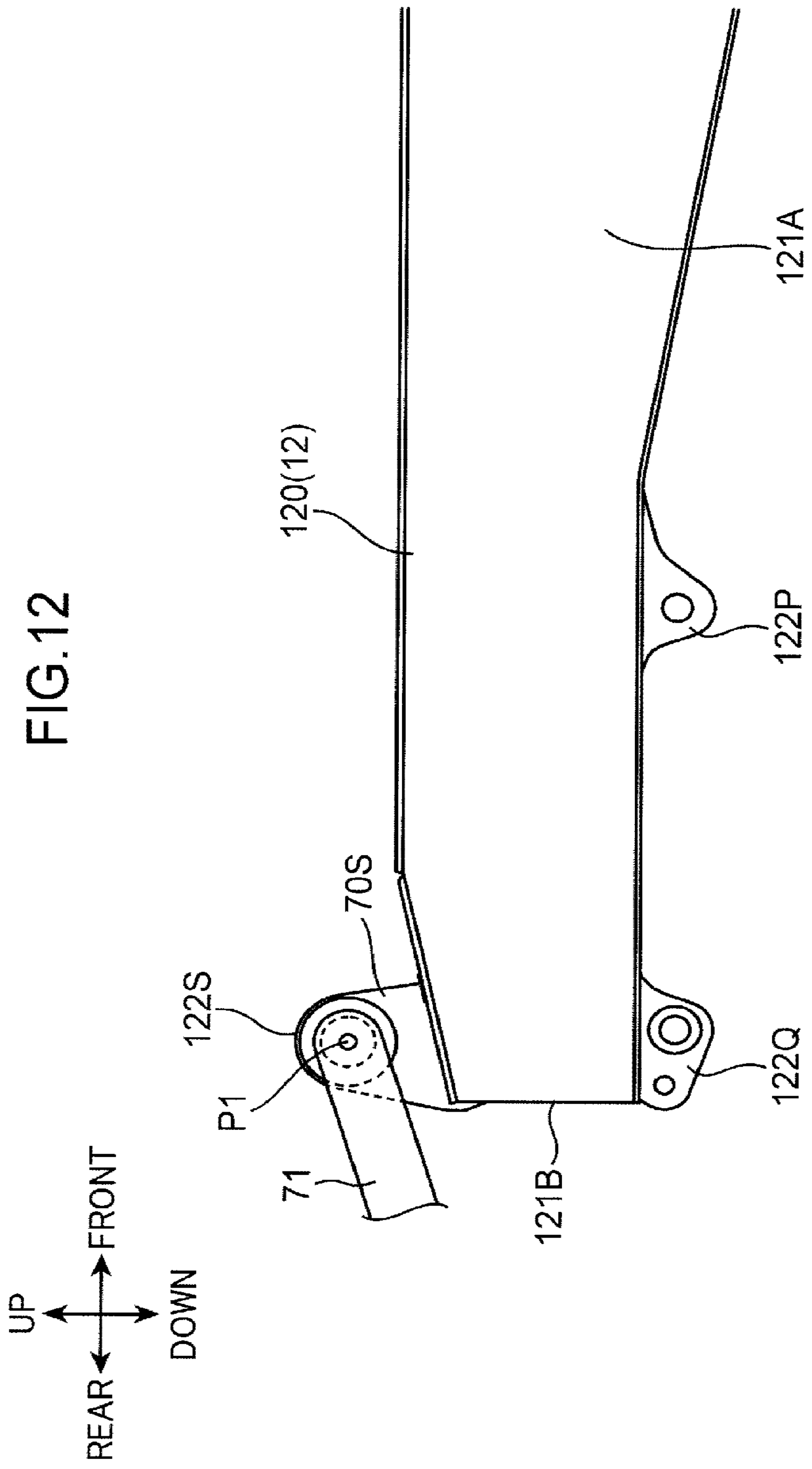
FIG. 12 is a side view of the stewing frame and the sheave link of the crane according to the first modification of the present invention.

(2) In the embodiment above, the configuration in which the sheave block 42 and the link unit 70 are supported on the same sheave support pin 122A is described, but the present invention is not limited to this. FIG. 11 and FIG. 12 are a plan view and a side view of a slewing frame 120 and a sheave link 71 of a crane according to a first modification of the present invention, respectively. In this modification, a pair of right and left link support portions 70S (frame auxiliary coupling portions) is provided on the right and left of the pair of right and left sheave attachment portions 122S on the rear lateral plate 121B of the slewing frame 120. Each of the link support portions 70S is couplable to the sheave link 71 in the embodiment above by the coupling pin P1.

On the other hand, also in this modification, the sheave block 42 is attached to the sheave attachment portions 122S as in the embodiment above. In other words, the pair of right and left link support portions 70S is located on the rear end portion of the slewing frame 120 in a juxtaposed arrangement to the sheave block 42 in the left-right direction.

Also in this configuration, since the position of attachment of the link unit 70 (to the link support portions 70S) is determined so as to be close to the position of attachment of the sheave block 42 (to the sheave attachment portions 122S), a force on the sheave block 42 due to the weight of the boom 16 is transmitted to the link unit 70 through the slewing frame 120 (rear lateral plate 121B). According to this configuration, the tilting device 16T and the link unit 70 are located so as to be continuously connected to each other via the sheave block 42 and the sheave attachment portion 122S in the front-rear direction, in the view of the left-right direction. Therefore, the sheave block 42 of the tilting device 16T functions as a support of the counterweights 13B and the base weight 13A via the rear end portion of the slewing frame 120, which can prevent the rear portion of the base weight 13A from bending downward more effectively.

Figure 13:
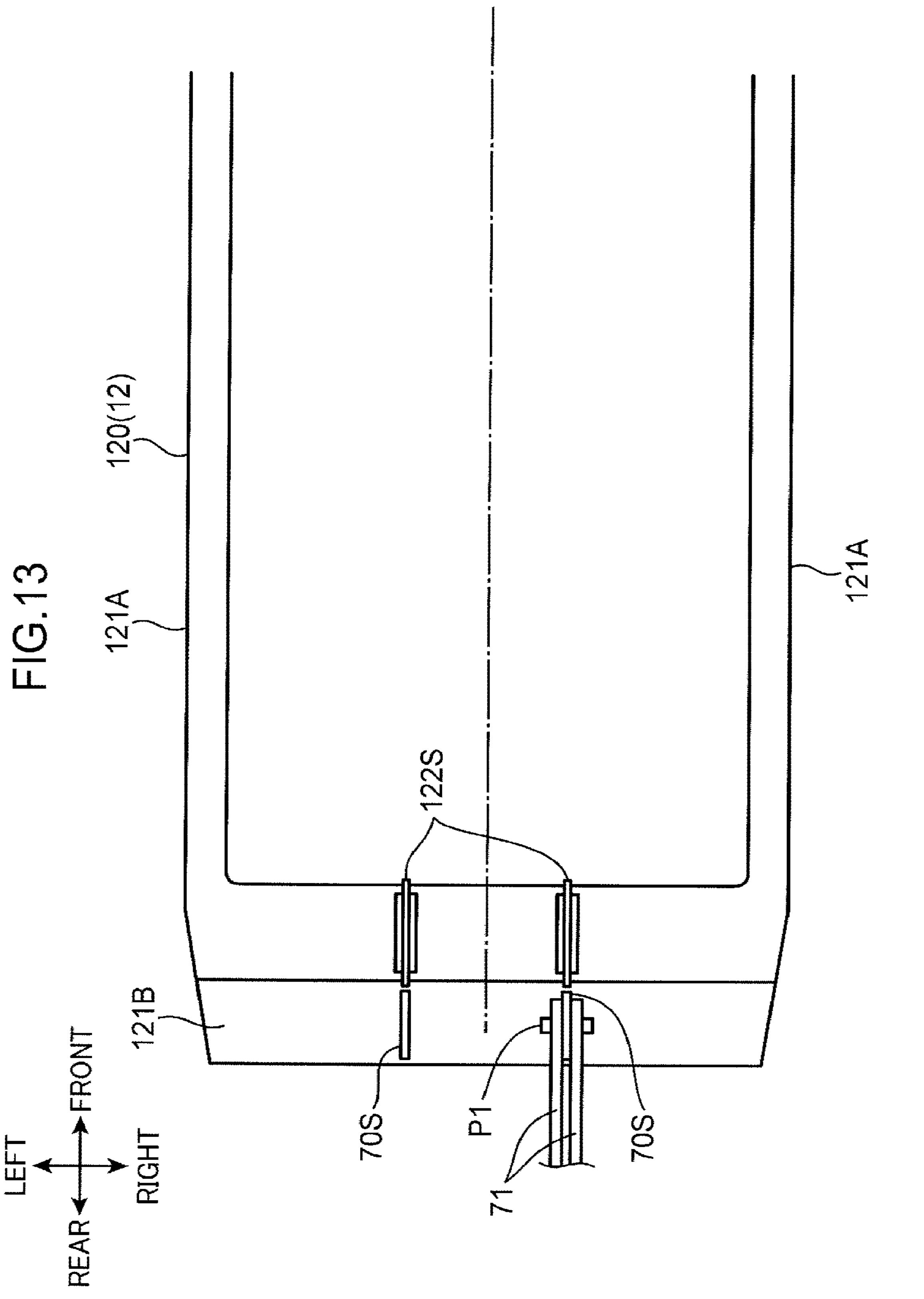
FIG. 13 is a plan view of a slewing frame and a sheave link of a crane according to a second modification of the present invention.
Figure 14:
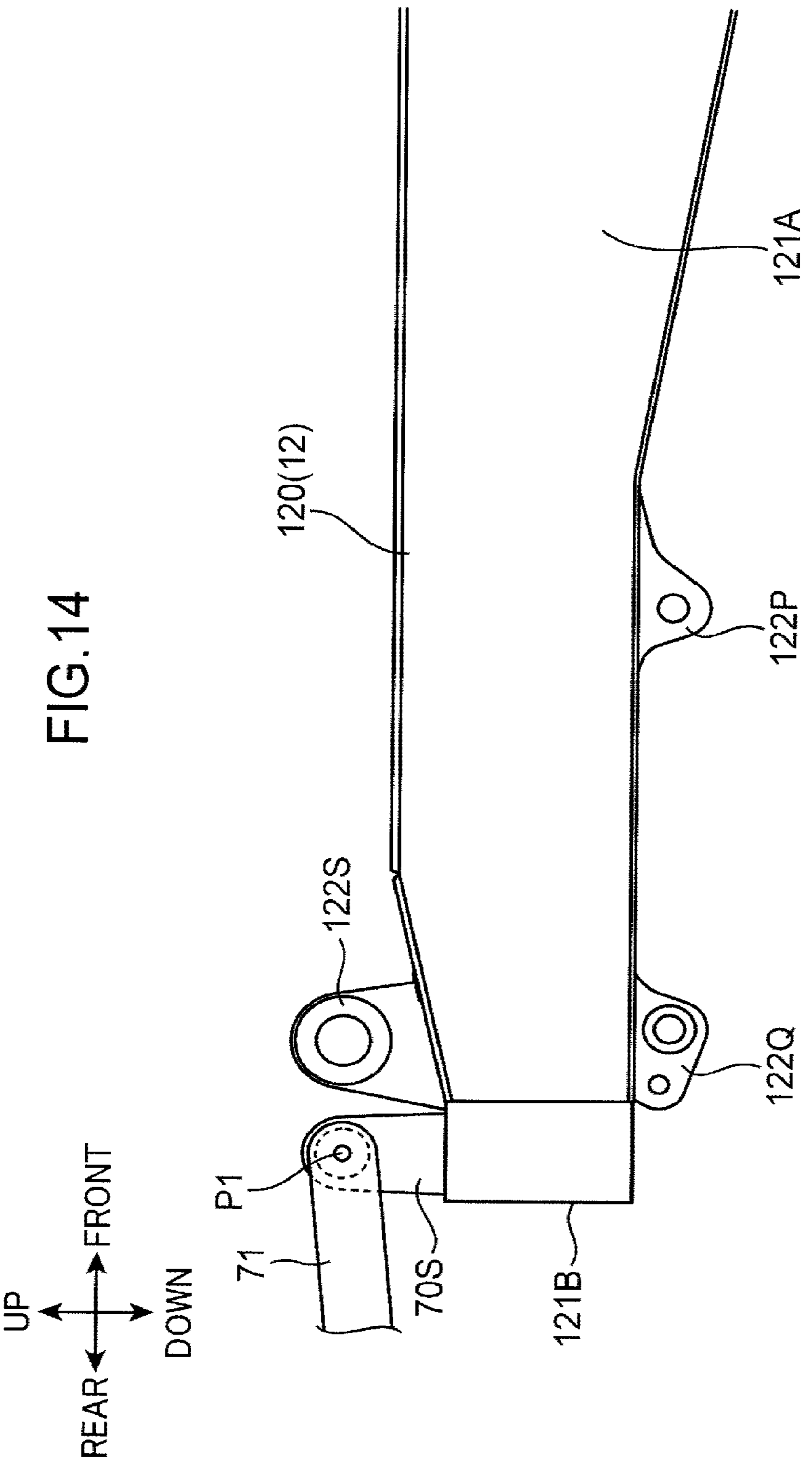
FIG. 14 is a side view of the stewing frame and the sheave link of the crane according to the second modification of the present invention.

FIG. 13 and FIG. 14 are a plan view and a side view of a slewing frame 120 and a sheave link 71 of a crane according to a second modification of the present invention, respectively. In this modification, a pair of right and left link support portions 70S (frame auxiliary coupling portions) is provided behind the pair of right and left sheave attachment portions 122S on the rear lateral plate 121B of the slewing frame 120. Each of the link support portions 70S is couplable to the sheave link 71 in the embodiment above by the coupling pin P1.

Also in this modification, the sheave block 42 is attached to the sheave attachment portions 122S as in the embodiment above. In other words, the pair of right and left link support portions 70S is located on the rear end portion of the slewing frame 120 in a juxtaposed arrangement to the sheave block 42 in the front-rear direction.

Also in this configuration, the tilting device 16T and the link unit 70 are located so as to be connected to each other via a part of the slewing frame 120 in the front-rear direction, in the view of the left-right direction. Therefore, the sheave block 42 of the tilting device 16T functions as a support of the counterweights 13B and the base weight 13A via the rear end portion of the slewing frame 120, which can prevent the rear portion of the base weight 13A from bending downward more effectively.

(3) In the embodiment above, the configuration in which the link unit 70 includes the pair of right and left sheave links 71 and the weight link 72 is described, but the present invention is not limited to this. The link unit 70 may be an integral unit that is not separable into the sheave links 71 and the weight link 72. The structure of the sheave block 42 (spreader) is not limited to the structure in FIG. 9 and FIG. 10, and may be another structure.

(4) Further, in the embodiment above, the configuration in which the pair of right and left frame front coupling portions 122P and the pair of right and left frame front coupling portions 122Q are respectively provided on the slewing frame 120 is described, but the present invention is not limited to this. Three or more pairs of frame coupling portions may be provided on the slewing frame 120 in the front-rear direction. In this case, the weight unit 13 can be located at three or more positions in the front-rear direction.

The present invention provides a crane. The crane includes: a machine body; a tiltable body having a tiltable body proximal end supported on the machine body and being turnable in a tilting direction; a counterweight; a base weight having a placement surface that allows placement of the counterweight and being detachably attached to the machine body in either at least a front position or a rear position located behind the front position with the base weight projecting rearward further from the machine body than in the front position; and an auxiliary coupling member for coupling a portion of the base weight located in the rear position and the machine body to each other, the portion projecting rearward from the machine body.

In this configuration, the base weight can be located in a plurality of positions in the front-rear direction with respect to the machine body by changing the coupling position of the base weight with respect to the machine body between the front position and the rear position. This enables a change in the magnitude of a moment by the counterweights and the base weight that acts on the machine body according to a change in a lifting condition including, e.g., the length of the tiltable body and the weight of a hoisted load, without a change in the weight of the counterweights placed on the base weight. Thus, the stability of the machine body can be maintained. Further, the auxiliary coupling member can couple the portion of the base weight located behind the machine body to the machine body. This can prevent a rear portion of the base weight from bending downward.

In the configuration above, preferably, the machine body may include a frame, a plurality of pairs of frame coupling portions provided on the frame behind the tiltable body, the pairs of frame coupling portions including a pair of right and left frame front coupling portions and a pair of right and left frame rear coupling portions provided behind the pair of right and left frame front coupling portions, and a frame auxiliary coupling portion provided on a rear end portion of the frame, the base weight may include a pair of right and left weight front coupling portions that is selectively coupled to one of the pair of right and left frame front coupling portions and the pair of right and left frame rear coupling portions, and a pair of right and left weight rear coupling portions that is located behind the pair of right and left weight front coupling portions so as to be couplable to the pair of right and left frame rear coupling portions in a front coupling state where the pair of right and left weight front coupling portions is coupled to the pair of right and left frame front coupling portions, and is located behind the frame in a rear coupling state where the pair of right and left weight front coupling portions is coupled to the pair of right and left frame rear coupling portions, and the auxiliary coupling member may be for coupling the frame auxiliary coupling portion and the pair of right and left weight rear coupling portions to each other in the rear coupling state.

In this configuration, the base weight can be located stably in a plurality of positions in the front-rear direction by changing the coupling position of the base weight with respect to the plurality of pairs of frame coupling portions provided on the frame. This enables a stable change in the magnitude of a moment by the counterweights and the base weight that acts on the machine body according to a change in a lifting condition including, e.g., the length of the tiltable body and the weight of the hoisted load, without a change in the weight of the counterweights placed on the base weight. Thus, the stability of the machine body can be maintained. Further, the auxiliary coupling member can couple the pair of right and left weight rear coupling portions located behind the frame to the frame auxiliary coupling portion. This can stably prevent the rear portion of the base weight from bending downward.

In the configuration above, preferably, the tiltable body may further have a tiltable body distal end located opposite to the tiltable body proximal end, and may further include a tilting device that is supported on the frame and connected to the tiltable body distal end behind the tiltable body to turn the tiltable body in the tilting direction, the tilting device may have a frame connection portion that is connected to the rear end portion of the frame so as to apply at least upward force to the rear end portion of the frame owing to a support of the tiltable body by the tilting device in a state where the tiltable body extends forward and upward from the machine body, and the frame auxiliary coupling portion may be located in a juxtaposed arrangement to the frame connection portion on the rear end portion of the frame so as to apply at least downward force to the frame connection portion owing to a weight of the counterweight in a state where the auxiliary coupling member couples the frame auxiliary coupling portion and the pair of right and left weight rear coupling portions to each other.

In this configuration, the weight of the counterweights acts on the frame connection portion downward through the auxiliary coupling member, and the weight of the tiltable body and the hoisted load acts on the frame connection portion so that the tiltable body distal end pulls the frame connection portion upward. Therefore, the frame connection portion connected to the tiltable body distal end serves a function of supporting the pair of right and left weight rear coupling portions via the auxiliary coupling member. This prevents the portion of the base weight located behind the frame from bending downward and can enhance the stability of the machine body.

In the configuration above, preferably, the frame auxiliary coupling portion may have a plurality of pin support portions located on the rear end portion of the frame and spaced away from each other in a left-right direction, and a support pin extending in the left-right direction to connect the pin support portions to each other, the tilting device may have a mast having a mast proximal end supported on the frame behind the tiltable body and in front of the frame auxiliary coupling portion and being turnable in the tilting direction and a mast distal end opposite to the mast proximal end, a guy line connecting the mast distal end and the tiltable body distal end to each other, a mast sheave block including a first sheave and supported on the mast distal end, a frame sheave block including a second sheave and supported by the support pin of the frame auxiliary coupling portion, and constituting the frame connection portion, a tilting rope extending between the first sheave of the mast sheave block and the second sheave of the frame sheave block, and a tilting winch for tilting the tiltable body together with the mast by winding and unwinding the tilting rope to change a distance between the mast sheave block and the frame sheave block, and the auxiliary coupling member may couple the support pin of the frame auxiliary coupling portion and the pair of right and left weight rear coupling portions to each other.

In this configuration, a placement of the counterweights on the base weight causes the weight of the base weight and the counterweights to act at least downward on the support pin through the base weight, the pair of right and left weight rear coupling portions, and the auxiliary coupling member. On the other hand, a support by the tilting device of the tiltable body gives at least upward force on the support pin through the liftable body distal end, the guy lines, the mast sheave block, the tilting rope, and the frame sheave block. Therefore, the frame sheave block connected to the tiltable body distal end serves a function of directly supporting the pair of right and left weight rear coupling portions via the support pin. This prevents the portion of the base weight located behind the frame from bending downward more effectively. Thus, the stability of the machine body can be further enhanced.

In the configuration above, preferably, the base weight may have such a size as to project from left and right sides of the frame in a view of a front-rear direction, the placement surface may include a right placement surface and a left placement surface respectively located on the right and left of the frame in the view of the front-rear direction, and the auxiliary coupling member may have a pair of right and left first coupling members coupled to the support pin on respective right and left sides of the frame sheave block, and a second coupling member including a pair of right and left upper coupling portions respectively coupled to the pair of right and left first coupling members, and a pair of right and left lower coupling portions respectively coupled to the pair of right and left weight rear coupling portions at outer positions in the left-right direction from the pair of right and left first coupling members.

In this configuration, the counterweights can be placed on the right placement surface and the left placement surface of the base weight respectively located on the right and left of the frame in the view of the front-rear direction. Thus, the stability of the machine body in the left-right direction as well as in the front-rear direction can be enhanced. Further, a location of the pair of first coupling members on the right and left of the frame sheave block in the left-right direction eases transmission of a force between the frame sheave block and the auxiliary coupling member via the support pin and enables the pair of right and left lower coupling portions of the auxiliary coupling member to stably support the base weight having a width in the left-right direction larger than that of the frame.

In the configuration above, the frame auxiliary coupling portion may be fixed to the frame in a juxtaposed arrangement to the frame connection portion in a left-right direction on the rear end portion of the frame. Alternatively, the frame auxiliary coupling portion may be in a juxtaposed arrangement to the frame connection portion in a front-rear direction on the rear end portion of the frame.

The present invention provides a crane which can maintain the stability of a machine body without increasing or decreasing the weight of a counterweight attached to the machine body according to a change in a lifting condition including, e.g., a length of a tiltable body and a weight of a hoisted load.

The invention claimed is:

1. A crane comprising:

a machine body;

a tiltable body having a tiltable body proximal end supported on the machine body and being turnable in a tilting direction;

a counterweight;

a base weight having a placement surface that allows placement of the counterweight and being selectably attachable to the machine body in both; a front position and a rear position located behind the front position with the base weight projecting rearward further from the machine body than in the front position, when attached the base weight is located below the machine body in the front position and the rear position; and an auxiliary coupling member for coupling a portion of the base weight located in the rear position and the machine body to each other, the portion being located below and projecting rearward from the machine body.

2. A crane comprising:

a machine body:

a tiltable body having a tiltable body proximal end supported on the machine body and being turnable in a tilting direction:

a counterweight:

a base weight having a placement surface that allows placement of the counterweight and being selectably attachable to the machine body in both a front position and a rear position located behind the front position with the base weight projecting rearward further from the machine body than in the front position; and an auxiliary coupling member for coupling a portion of the base weight located in the rear position and the machine body to each other, the portion projecting rearward from the machine body, wherein the machine body includes a frame, a plurality of pairs of frame coupling portions provided on the frame behind the tiltable body, the pairs of frame coupling portions including a pair of right and left frame front coupling portions and a pair of right and left frame rear coupling portions provided behind the pair of right and left frame front coupling portions, and a frame auxiliary coupling portion provided on a rear end portion of the frame, the base weight includes a pair of right and left weight front coupling portions that is selectively coupled to one of the pair of right and left frame front coupling portions and the pair of right and left frame rear coupling portions, and a pair of right and left weight rear coupling portions that is located behind the pair of right and left weight front coupling portions so as to be couplable to the pair of right and left frame rear coupling portions in a front coupling state where the pair of right and left weight front coupling portions is coupled to the pair of right and left frame front coupling portions, and is located behind the frame in a rear coupling state where the pair of right and left weight front coupling portions is coupled to the pair of right and left frame rear coupling portions, and the auxiliary coupling member is for coupling the frame auxiliary coupling portion and the pair of right and left weight rear coupling portions to each other in the rear coupling state.

3. The crane according to claim 2, wherein the tiltable body further has a tiltable body distal end located opposite to the tiltable body proximal end, and further includes a tilting device that is supported on the frame and connected to the tiltable body distal end behind the tiltable body to turn the tiltable body in the tilting direction, the tilting device has a frame connection portion that is connected to the rear end portion of the frame so as to apply at least upward force to the rear end portion of the frame owing to a support of the tiltable body by the tilting device in a state where the tiltable body extends forward and upward from the machine body, and the frame auxiliary coupling portion is located in a juxtaposed arrangement to the frame connection portion on the rear end portion of the frame so as to apply at least downward force to the frame connection portion owing to a weight of the counterweight in a state where the auxiliary coupling member couples the frame auxiliary coupling portion and the pair of right and left weight rear coupling portions to each other.

4. The crane according to claim 3, wherein the frame auxiliary coupling portion has a plurality of pin support portions located on the rear end portion of the frame and spaced away from each other in a left-right direction, and a support pin extending in the left-right direction to connect the pin support portions to each other, the tilting device has a mast having a mast proximal end supported on the frame behind the tiltable body and in front of the frame auxiliary coupling portion and being turnable in the tilting direction and a mast distal end opposite to the mast proximal end, a guy line connecting the mast distal end and the tiltable body distal end to each other, a mast sheave block including a first sheave and supported on the mast distal end, a frame sheave block including a second sheave and supported by the support pin of the frame auxiliary coupling portion, and constituting the frame connection portion, a tilting rope extending between the first sheave of the mast sheave block and the second sheave of the frame sheave block, and a tilting winch for tilting the tiltable body together with the mast by winding and unwinding the tilting rope to change a distance between the mast sheave block and the frame sheave block, and the auxiliary coupling member couples the support pin of the frame auxiliary coupling portion and the pair of right and left weight rear coupling portions to each other.

5. The crane according to claim 4, wherein the base weight has such a size as to project from left and right sides of the frame in a view of a front-rear direction, the placement surface includes a right placement surface and a left placement surface respectively located on the right and left of the frame in the view of the front-rear direction and allowing placement of the counterweight, the auxiliary coupling member has a pair of right and left first coupling members coupled to the support pin on respective right and left sides of the frame sheave block, and a second coupling member including a pair of right and left upper coupling portions respectively coupled to the pair of right and left first coupling members, and a pair of right and left lower coupling portions respectively coupled to the pair of right and left weight rear coupling portions at outer positions in the left-right direction from the pair of right and left first coupling members.

6. The crane according to claim 3, wherein the frame auxiliary coupling portion is fixed to the frame in a juxtaposed arrangement to the frame connection portion in a left-right direction on the rear end portion of the frame.

7. The crane according to claim 3, wherein the frame auxiliary coupling portion is fixed to the frame in a juxtaposed arrangement to the frame connection portion in a front-rear direction on the rear end portion of the frame.

* * * * *